Patented Sept. 6, 1932

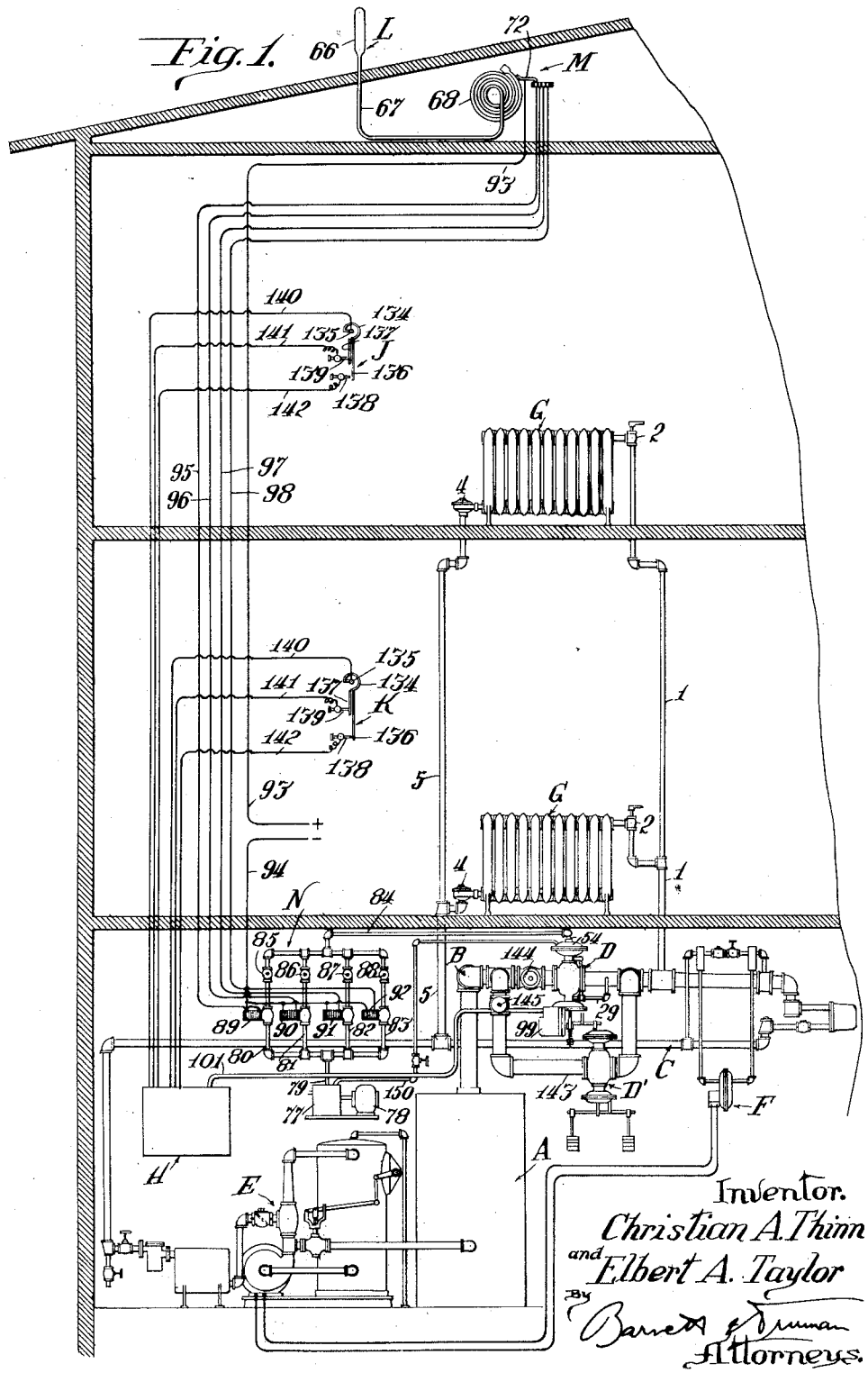

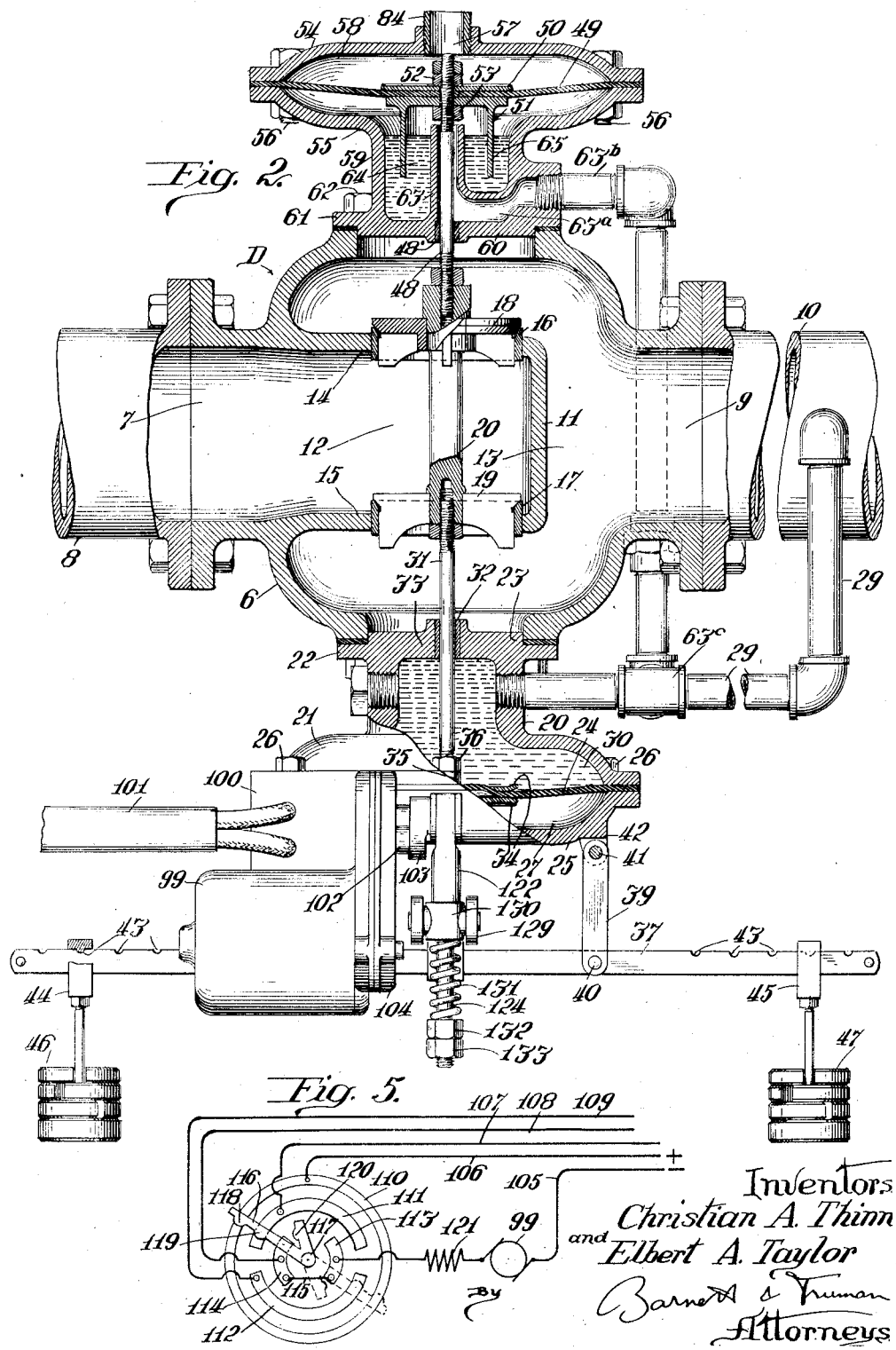

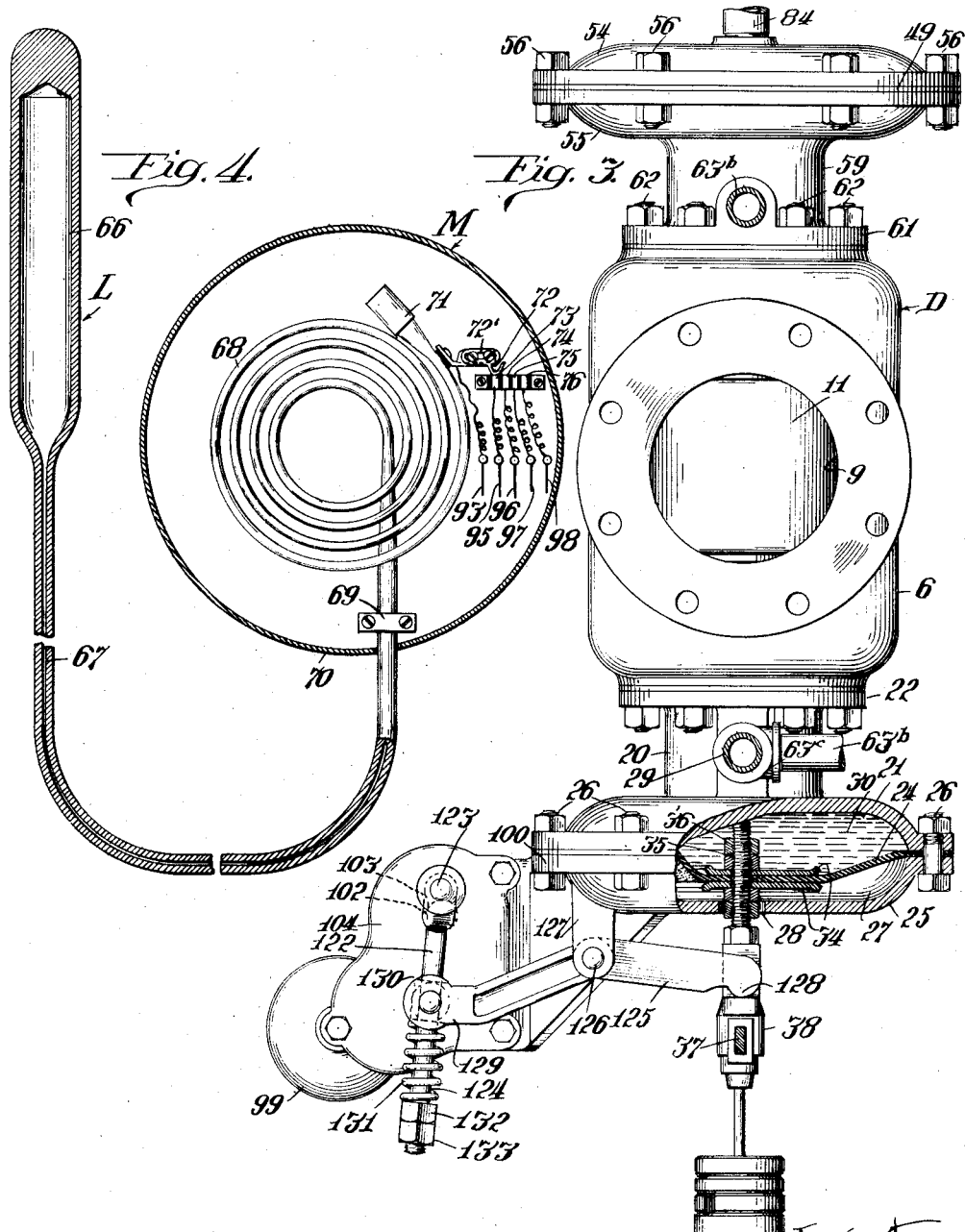

1,875,957

UNITED STATES PATENT OFFICE

CHRISTIAN A. THINN, OF CHICAGO, AND ELBERT A. TAYLOR, OF ARLINGTON HEIGHTS, ILLINOIS, ASSIGNORS TO C. A. DUNHAM COMPANY, OF MARSHALLTOWN, ILLINOIS, A CORPORATION OF IOWA

TEMPERATURE CONTROL MECHANISM FOR HEATING SYSTEMS

Application filed December 9, 1929. Serial No. 412,850.

This invention relates to certain new and useful improvements in temperature control mechanism for heating systems, and more particularly to means for automatically regulating the heating system in accordance with temperature changes both inside and outside the building that is being heated. The improvements of this invention are particularly designed for use with a sub-atmospheric steam heating system of the type disclosed in the patent to Dunham, 1,644,114, granted Oct. 4, 1927, although with slight variations from the example hereinafter disclosed the invention is applicable to other types of heating systems.

In a sub-atmospheric heating system of the type hereinabove referred to, the amount of heat given out by the radiating system is determined by regulating the sub-atmospheric pressure (and hence the temperature) of the steam supplied to the radiators. This steam pressure is regulated by means of a reducing valve positioned in the steam supply main and manually adjustable so as to automatically maintain a predetermined and substantially constant steam pressure at the low pressure side of the valve. According to the present invention, a thermostat is positioned outside of the building that is being heated and means is provided, automatically controlled by this thermostat, for varying the setting of the reducing valve in accordance with changes in the outside temperature. In other words, if the outside temperature becomes lower, the pressure of the steam at the low pressure side of the reducing valve will be automatically elevated (or the vacuum decreased) so that hotter steam will be supplied to the radiators and a greater amount of heat given out to compensate for the drop in outside temperature. The reducing valve is also under the control of a second thermostat, or group of thermostats, positioned at suitable locations inside the building that is being heated and adapted to automatically close the reducing valve and thus entirely cut off the flow of steam therethrough whenever a predetermined maximum temperature is reached in that portion of the building in which the thermostat is positioned.

The principal object of this invention is to provide an improved temperature control mechanism of the type briefly described hereinabove and disclosed more in detail in the specifications which follow.

Another object is to provide an improved form of reducing valve adapted to be automatically controlled in accordance with changes in both outside and inside temperatures.

Another object is to provide an improved temperature control system wherein the temperature of the heating medium will be varied inversely with changes in the temperature outside of the building, and the supply of heating medium will be entirely cut off when a predetermined maximum temperature is attained inside the building.

Other objects and advantages of this invention will be more apparent from the following detailed description of one approved form of apparatus embodying the principles of this invention.

In the accompanying drawings:

Fig. 1 is a vertical section through a building showing rather diagrammatically in elevation the various parts of the heating system and the control apparatus applied thereto.

Fig. 2 is a side elevation, partially in central vertical section, of the improved reducing valve.

Fig. 3 is an end elevation of this reducing valve, partially broken away.

Fig. 4 is a vertical section through the outside theremostat and the temperature controlled switch operated thereby.

Fig. 5 is a wiring diagram for the valve-operating motor.

Referring first to Fig. 1, the heating system herein indicated by way of example, is of the type disclosed and claimed in the Dunham Patent 1,644,114, hereinabove referred to. While the control system forming the particular subject matter of this invention is especially designed for use with this sub-atmospheric steam heating system, it is to be understood that the control system is also applicable to use with other types of heating systems, as will be hereinafter apparent. The heating system comprises in general a boiler or generator A, a steam supply main B, a return main C for condensate and non-condensible gases, a reducing valve D in the supply main B for determining the pressure of the steam supplied to the radiators G, and an exhausting mechanism E and a differential-pressure regulating mechanism F adapted, in cooperation with the reducing valve D, to maintain the desired sub-atmospheric pressure in the radiating system and also to maintain a certain pressure differential between the supply and return sides of each radiator so as to insure a flow of steam therethrough. Each radiator G is supplied with steam from supply main B through riser 1 and inlet valve 2, and the condensate and non-condensible gases flow out through steam trap 4 and pipe 5 to the return main C. The heating system operates substantially as set forth in the Dunham patent hereinabove referred to, the radiators G being kept substantially filled with steam at a predetermined but adjustable sub-atmospheric pressure, whereby the amount of heat given out may be varied in accordance with temperature requirements. The sub-atmospheric pressure of the steam delivered to the radiators G is determined by the setting of reducing valve D.

The present invention contemplates the automatic control of the reducing valve D (and hence of the heating system) in accordance with temperature conditions both inside and outside of the building that is being heated. For this purpose a plurality of thermostats indicated at J and K operates through a control panel H to close the reducing valve D whenever a desired maximum temperature has been attained within those portions of the building where the thermostats J and K are positioned. Also a thermostat L, positioned outside of the building, is adapted through an automatic switch mechanism M and a fluid pressure adjusting mechanism indicated generally at N, to automatically vary the setting of the reducing valve D and thus regulate the sub-atmospheric pressure of the steam delivered to radiators G.

Referring now more particularly to Figs. 2 and 3, the improved reducing valve D will be described more in detail. The valve casing 6 is provided with an inlet port 7 communicating with the high pressure portion 8 of the supply main B leading from generator A, and is also provided with an outlet port 9 communicating with the low pressure portion 10 of supply main B from which the risers 1 lead to the several radiators. An internal web 11 divides the casing 6 into a high pressure chamber 12 and a low pressure chamber 13, the web 11 comprising parallel horizontal portions 14 and 15 provided with aligned vertical valve openings in which are positioned the valve seats 16 and 17 respectively. The semi-balanced valves 18 and 19, connected by stem 20 so as to operate in unison, are adapted to engage respectively the valve seats 16 and 17 to cut off communication between the high pressure chamber 12 and the low pressure chamber 13. When these valves are raised from their seats by the mechanism hereinafter described, steam will flow from the high pressure source through the valve openings into the low pressure chamber 13 so as to increase the quantity of steam therein and consequently elevate the lower pressure. When this low pressure has been raised to the desired maximum, the valves 18 and 19 will be automatically moved against their seats so as to prevent the further passage of steam into low pressure chamber 13, and the subsequent usage or condensation of the steam at the low pressure side of the valve will lower this pressure until a desired minimum has been reached, at which times the valves 18 and 19 will again be raised to admit more steam into chamber 13.

The upper portion 21 of the lower diaphragm casing has an outwardly projecting flange 22 secured to the bottom of casing 6 and an upwardly extending annular flange 23 adapted to properly center the diaphragm casing within the opening in the bottom of casing 6. A circular flexible metallic or composition diaphragm 24 is clamped at its outer edge between the dished lower portion of casing 21 and the lower diaphragm casing member 25. These dished casing members 21 and 25 are secured together about the diaphragm 24 by means of a plurality of bolts 26. The chamber 27 at the lower side of diaphragm 24 is in communication with the outer atmosphere through central opening 28. A conduit or pipe 29 leads from the pressure chamber 30 above diaphragm 24 to the low pressure portion 10 of the supply main at a location somewhat remote from the valve so as not to be influenced by pressure fluctuations within the valve chamber. The pipe 29 and chamber 30 above diaphragm 24 will become filled with liquid condensate so as to form a water seal, preventing the direct contact of steam with the diaphragm 24.

A valve stem 31 is secured at its upper end to the valve assembly 18, 19 and 20, projects downwardly through the slide bearing 32 formed in the web 33 which separates low pressure chamber 13 from chamber 30 above the diaphragm, and then projects through a central opening in diaphragm 24 and through opening 28 in the bottom of the diaphragm casing 25. The stem 31 is sealed to diaphragm 24 so as to move therewith and so as to prevent the passage of fluid through the diaphragm, by means of diaphragm plates 34 held in place by positioning nuts 35 and lock nuts 36 threaded upon the valve stem 31. It will be noted that the low pressure in chamber 30 will normally be substantially the same as the pressure in chamber 13 so that no stuffing box is required at 32, this bearing serving principally as a guide for the stem 31.

A lever 37 is intermediately pivoted in a yoke member 38 secured on the lower end of valve stem 31. A fulcrum link 39 is pivoted at its lower end 40 to one arm of lever 37, and is pivotally suspended at 41 from bracket 42 formed on diaphragm casing 25. The two arms of lever 37 are notched at 43 to hold the supporting yokes 44 and 45, which carry the adjustable weights 46 and 47, respectively. It will be apparent that by varying the amount of weights 46 and 47 and by varying their distances from the fulcrum point 40 by adjusting the yokes 44 and 45 in notches 43, the vertical pressure exerted on the lower end of valve stem 31 may be varied as desired. The use of the fulcrum link 39 avoids lost motion between lever 37 and valve stem 31 and reduces to a minimum the side thrusts on the valve stem. The yoke arms 44 and 45 may be made as long as desired so that the adjustable weights 46 and 47 will be accessible, even though the reducing valve is positioned at a rather high elevation.

A second valve stem 48, which is practically an upward extension of the lower valve stem 31, is secured at its lower end to the valve assembly 18, 19 and 20, and its upper threaded end passes through a central opening in a second flexible diaphragm 49. Valve stem 48 is secured to diaphragm 49 by the upper diaphragm plate 50 and lower inverted cup 51, these parts being clamped against the diaphragm by the nuts 52 and 53 screwed on the valve stem 48. The circular flexible metallic composition diaphragm 49 which is of less area than the lower diaphragm 24 is clamped at its outer edges between the opposed dished casing members 54 and 55 secured together by bolts 56. The upper casing member 54 is provided with an inlet port 57, through which air or other fluid under a predetermined pressure, is admitted to the chamber 58 above the diaphragm 49. The lower member 55 of the diaphragm casing has a downwardly extending cylindrical portion 59 and an inwardly extending bottom portion 60 mounted in the top of valve casing 6 and secured thereto by means of the outwardly extending flange 61 and bolts 62. A central upwardly extending tubular portion 63 completes an annular well 64 formed in the lower casing member 55. The downwardly extending sides 65 of the inverted cup 51 project into the liquid collected in well 64. The valve stem 48 projects through a guide bushing 48' in wall 60 and loosely through the tubular member 63 so as to leave an annular steam passage or conduit therearound, which communicates through lateral conduit 63a with a pipe 63b leading into the low pressure control pipe 29 at 63c. In this manner steam at the low pressure existing in chamber 13 is permitted to flow into the inverted cup 51.

The annular well 64 will be maintained filled with liquid condensate by condensation of steam. The body of liquid in well 64 is sufficiently large so that it is never entirely displaced by vertical movement of the inverted cup so that there will always be a liquid seal, which will prevent the steam within the cup from coming in contact with the diaphragm 49. However, the entire movable lower surface of diaphragm 49 will be subjected to a pressure equal to that of the steam at the low pressure side of the valve. Aside from serving as a liquid seal, the movements of the inverted cup within the liquid in the annular well, have a dash pot effect, tending to dampen any vibrations that might result from rapid pressure fluctuations due to the flow of steam through the valves.

Under normal conditions, steam at the low pressure existing in the low pressure side of the system will be admitted to pressure chamber 30 above the larger diaphragm 24, and steam at this pressure is always admitted to the chamber beneath upper diaphragm 49. Assuming for the time being that the fluid admitted to chamber 58 above upper diaphragm 49 is at atmospheric pressure, it will be seen that each of the diaphragms 44 and 49 is subject to a force equal to the difference in pressure between atmospheric and the pressure existing in the low pressure side of the system, multiplied by the exposed area of the respective diaphragm. It will be noted that these forces will aways be opposed to one another but the effective area of the lower diaphragm 24 is greater than the effective area of the upper diaphragm 49, so that a force equal to the difference between these opposed forces will be available to move the valves 18 and 19 toward or from their seats. This latter force is opposed by the adjustable weights 46 or 47 so as to secure the desired pressure at the low pressure side of the valve. If, for example, there is a preponderance of weight applied to the left hand arm of lever 37, there will be a constant downward force exerted on the valve stems, tending to hold the valves 18 and 19 upon their seats. In order to overcome this force and open the valves, the pressure differential applied to the diaphragm 24 must exert an upward pressure on the valve stem 31. It will be apparent that in order to secure this pressure differential, the pressure in the upper chamber 30 will have to be below atmospheric. As the preponderance of weight on the left hand arm of the lever 37 is increased, the pressure in chamber 30 will have to be lowered (or the vacuum increased) in order that the pressure differential applied to diaphragm 24 will be sufficient to overcome the opposed pressure differential on diaphragm 49 and also to lift the weights. The valves 18 and 19 will, therefore, remain closed until this vacuum is attained in the low pressure side of the system, whereupon the valves 18 and 19 will be opened to admit more steam into the low pressure chamber 13. As soon as the sub-atmospheric pressure has been raised above the vacuum for which the valve is set, the pressure differential exerted on diaphragm 24 will be no longer sufficient to hold up the weights, and the valves 18 and 19 will be automatically closed.

The reducing valve, as hereinabove described, will, when properly adjusted, maintain steam in the radiators G at any desired sub-atmospheric pressure, and consequently low temperature, so as to maintain a desired substantially constant low heat output to replace heat losses in the space, the temperature of which is being regulated. However, additional mechanism is provided whereby the adjustment of this reducing valve may be automatically changed in accordance with changes in the temperature prevailing outside of the building so that steam at a higher pressure and consequently higher temperature may be supplied when the outside temperature falls, or conversely the pressure or temperature of the steam may be lowered when the outside temperature rises so that less heat is supplied to maintain the building at the desired temperature. For this purpose, in the example here shown, the fluid pressure applied to the upper side of diaphragm 49 is varied in accordance with outside temperature changes. It will be apparent that the same results could be obtained by varying the pressure applied to the lower side of lower diaphragm 24. In fact, the upper diaphragm 49 is not essential at all to the operation of this invention except as a balancing means to obtain a more even and effective operation of the valve, and to decrease the necessary size of the adjustable weights 46 and 47.

Referring now to Figs. 1 and 4, the thermostat L comprises a bulb 66 positioned at some convenient point outside of the building so as to be subject to outdoor temperatures, this bulb being connected by the tube or conduit 67 with the coiled expansible tube 68 anchored at one end 69 in the casing 70 of switch mechanism M. The free closed end 71 of tube 68 carries a contact member 72 adapted to make contact alternatively with a plurality of fixed contacts 73, 74, 75 and 76 suitably insulated from one another and positioned within the casing 70. In order to permit proper adjustment of the circuit controller the supporting arm for contact 72 may be made adjustable in length as indicated at 72'. The bulb 66, tube 67 and tube 68 are filled with a suitable temperature responsive fluid, which expands as the outside temperature rises and contracts as the outside temperature cools. As this fluid expands the coiled tube 68 will also expand and move the contact 72 outwardly along the row of fixed contacts until it eventually engages with the outermost fixed contact 76. As the fluid contracts, the movable contact 72 will be drawn inwardly until it engages with the innermost contact 73.

At 77 (Fig. 1) is indicated a suitable compresser for air or other fluid, driven by the motor 78 and adapted to deliver this fluid at a substantially constant pressure through the pipe 79. The pipe 79 connects with a plurality of similar branch conduits 80, 81, 82 and 83 which respectively discharge into the pipe 84 which extends to the pressure chamber 58 above diaphragm 49 of valve D. Preferably a valved leakage line 150 extends from diaphragm chamber 58 back to the intake of the compresser 77 so as to permit the pressure in the diaphragm chamber to be quickly adjusted, as hereinafter described. In each of the several branch pipes 80 to 83 inclusive is positioned a suitable reducing valve 85, 86, 87 and 88. These reducing valves are set so as to deliver different pressures at the discharge side of each reducing valve. For example, valve 85 may be set to deliver air at 5 pounds per square inch pressure, valve 86 at 10 pounds, valve 87 at 15 pounds, and valve 88 at 20 pounds. It is to be understood that these pressures are given merely by way of example and do not necessarily indicate the actual pressures used for controlling the valve D. In each of the branch pipes 80 to 83 inclusive is positioned a similar magnetically operated cut-off valve, indicated by the reference characters 89, 90, 91 and 92. One lead 93 from a source of electrical power extends to the movable contact member 72 of switch M. The other power lead 94 is connected in parallel with one terminal of each of the magnetically operated switches 89 to 92 inclusive. The other terminal of magnetically operated valve 89 is connected by wire 95 with the fixed contact 73 of switch M, and in an exactly similar manner, the other three magnetically operated valves 90, 91 and 92 are connected by wires 96, 97 and 98 with the other three fixed contact members 74, 75 and 76.

With the parts in the position shown in the drawings, the thermostat L is subjected to a minimum or cold outside temperature, and tube 68 has contracted so as to move contact member 72 into engagement with the innermost fixed contact 73. A circuit is now completed for opening valve 89, as follows: positive lead 93, movable contact 72, fixed contact 73, wire 95, coil 89 of the magnetically operated valve, and lead 94 back to the negative side of the power source. At this time branch pipe 80 will be open and the other three branch pipes 81, 82 and 83 will be closed. It was assumed that the reducing valve 85 in branch pipe 80 has been set so as to deliver air or other fluid at the lowest pressure (for example five pounds per square inch) through pipe 84 to the pressure chamber 58 above diaphragm 49. It will now be apparent that this lowered pressure exerted on diaphragm 49 will decrease the pressure tending to hold the valves 18 and 19 closed, and a lesser degree of vacuum in chamber 13 will be sufficient to cause the valves to open. Consequently, the sub-atmospheric pressure of the steam delivered to the radiators G will be raised and the temperature of the radiators will be increased so as to give off more heat and compensate for the low temperature prevailing outside the building.

If the temperature outside the building rises, the fluid in bulb 66 and tube 68 will expand, thus causing the coiled tube 68 to expand and move the contact member 72 outwardly so as to engage with one of the other fixed contacts 74, 75 or 76. This will successively open one or the other of the branch pipes 81, 82 or 83 so as to deliver air at a higher pressure through pipe 84 to the chamber 58 above diaphragm 49. It will be apparent that as the pressure above this diaphragm is increased, a greater degree of vacuum in chamber 13 will be necessary in order to lift the valves 18 and 19 from their seats. Consequently the sub-atmospheric pressure of the steam delivered to radiators G will be decreased so as to lessen the heat output, less heat being required when the outside temperature rises.

Means is also provided for controlling the reducing valve D in accordance with the temperatures attained within the building. A small electric motor 99, supported by bracket 100 from the diaphragm casing 25, is connected by a cable 101 with the central control panel H. A shaft 102 carries a crank arm 103, the shaft 102 being driven from motor 99 through a system of reduction gearing contained in the casing 104. The motor assembly contains an automatic switch device whereby motor 99 will continue to operate when once started until the crank arm 103 has been rotated through 180°, after which the motor 99 will automatically stop. When motor 99 is again started it will rotate crank 103 through another 180° and then again stop.

This automatic switch mechanism is indicated diagrammatically in Fig. 5. The five wires 105, 106, 107, 108 and 109 are contained in the cable 101 leading to the control panel H. Wires 105, 106 connect with the source of power. Wires 107, 108 and 109 connect with a suitable thermostatically operated relay mechanism whereby connection is alternatively made either between wires 107 and 108, or between wires 108 and 109. The circuit controller comprises a fixed disc carrying a continuous contact ring 110, a pair of similar arcuate contact rings 111, 112, and a smaller pair of arcuate contacts 113, 114, connected by a bridging wire 115. The arcuate contacts 113 and 114 are adapted to overlap the spaces between the ends of arcuate contacts 111 and 112. A movable contact arm 116 centrally pivoted at 117 is adapted to rotate in unison with the valve operating crank arm 103, in other words this movable contact member will travel from the position shown in solid lines (Fig. 5) to the position shown in dotted lines, while crank arm 103 is moving through a corresponding arc of 180°. The arm 116 carries connected contacts 118, 119 and 120 adapted to engage respectively with the ring 110, the pair of contacts 111 and 112, and the inner pair of contacts 113 and 114. Power line 106 connects with the ring 110. Power line 105 leads to the armature of motor 99, thence through series field 121 to the arcuate contact 113. Control wire 108 leads to the other inner arcuate contact 114. The other pair of control wires 107 and 109 connect, respectively, with the arcuate contacts 111 and 112. Ordinarily the wire 108 will connect with the central movable contact of a master relay, and the wires 107, 109 will connect with a pair of fixed contacts between which this movable contact swings. Assuming the parts are in the position shown in solid lines in Fig. 5, and the thermostatically controlled relay has functioned to complete a circuit between wires 107, 108, an operating circuit for motor 99 will be completed as follows: From positive main 106 to ring 110, contact arm 116, arcuate contact 111, wire 107, wire 108, arcuate contact 114, wire 115, contact 113, field 121, armature of motor 99, and thence to negative main 105. The motor will now begin to rotate and will cause the contact arm 116 to slowly rotate from the position shown in solid lines to the position indicated in dotted lines 180° therefrom. After contact 120 has engaged with arcuate contact 113, a circuit will be completed directly from ring 110 to contact 113 so that the motor actuating circuit will not be broken when contact 119 passes from the end of arcuate contact 111. However, when contact 120 passes from the end of arcuate contact 113 the circuit will be broken and the motor will stop with the contact arm in the position indicated in dotted lines. The crank arm 103 has now been moved through an arc of 180°, and the reducing valve has been closed or opened, as will hereinafter be apparent. Assuming now that temperature conditions have changed and the thermostatically operated relay has functioned to complete a circuit between wires 108, 109 and break the circuit through wires 107 and 108, a motor-actuating circuit exactly similar to the one previously described, but passing through arcuate contact 112 instead of arcuate contact 111, will now be completed and the motor will be actuated to move the crank arm 103 and contact arm 116 through another arc of 180° in a clockwise direction, thus returning the parts to the position shown in solid lines in Fig. 5.

Returning now to the valve operating structure shown in Figs. 2 and 3, a link 122 is pivoted at its upper end 123 to the outer end of crank arm 103. An extension stem 124 is threaded into the lower end of link 122. A lever 125 is intermediately pivoted at 126 to a bracket 127 extending downwardly from diaphragm casing 25. One end 128 of this lever engages in a suitable slot or opening in the yoke 38 secured to the lower end of valve stem 31. When the end 128 of lever 125 is depressed, it will force down the yoke 38 and consequently the stem 31 and positively close the valves 18 and 19. When this end 128 of lever 125 is elevated, the yoke 38 will be released and the valves will be returned to the control of the pressure diaphragms. The other end of lever 125 is forked at 129 and pivotally connected with a block 130 slidable on the stem 124 and held against the lower end of link 122 by spring 131 surrounding the stem 124 and confined between block 130 and adjusting nut 132 and lock nut 133 on the lower end of stem 124. It will now be apparent that when the motor operated crank arm 103 is swung to the upper position indicated in Figs. 2 and 3, it will lift the link 122 and stem 124 and pull up on the left hand arm of lever 125 (Fig. 3) thus depressing the right hand end 128 and positively closing the valves 18 and 19. The movement of crank arm 103 will be more than sufficient to force the valves against their seats, the additional movement of the crank arm being permitted by a compression of spring 131. This spring insures a complete closing of the valves without injury thereto. When crank arm 103 is again rotated through an arc of 180° until it projects downwardly from the position shown in the drawings, it will depress the end 129 of lever 125, thus elevating the end 128 and returning the reducing valve to the control of the pressure operated diaphragms. As will be hereinafter described, the motor 99 is connected up with suitable thermostatic mechanism whereby when a desired maximum temperature is attained in some portion of the building the motor will be automatically set in motion to cause the valves 18 and 19 to be closed regardless of the fluid pressures acting on the diaphragms 24 and 49. Whenever the temperature in these portions of the building is lowered below the desired maximum, the motor 99 will again be operated to release the valve stem and place the valves once more in control of the pressure operated diaphragms.

The thermostats J and K, which may be positioned in any desired portions of the building, are preferably of the type shown in Fig. 1, comprising a temperature responsive element 134 anchored at one end 135 and carrying at its free end a long flexible contact member 136 and a shorter and stiffer contact member 137. The movable contact members 136 and 137 are adapted to contact respectively with a pair of fixed but adjustable contacts 138 and 139. Wires 140, 141 and 142 lead respectively from the pair of movable contacts 136 and 137, and the fixed contacts 138 and 139 to the control panel H. The connections are such that when the long flexible contact 136 engages the fixed contact 138 no actuating circuit will be completed, but when the shorter contact 137 engages the contact 139 the actuating circuit will be completed and this circuit will not be broken until the longer contact member 136 has again disengaged the contact 138. This permits a period of lag, during which the circuit will remain closed, and prevents chattering of the switch and burning out of the contact members. The control panel H comprises mechanism whereby either or both of the thermostats J and K can be placed in control of the reducing valve D, and also of a group of signals or indicating lights, whereby the condition of the several thermostats and of the reducing valve is made apparent at all times to the engineer in charge. This latter portion of the control system is disclosed more in detail and claimed in the co-pending application of Dunham, Serial No. 396,209 filed September 30, 1929. It is sufficient to say at this time that whichever one of the thermostats J or K is exposed to the lower temperature and first operates to close an actuating circuit, will, through suitable relay mechanism, cause the reducing valve D to be operated to open the valves, or return the valves to the control of the pressure operated diaphragms. When both thermostats J and K are operated, by higher temperatures, to open the contacts, the relay mechanism will operate to cause the reducing valve D to be positively closed, as hereinabove described.

It will now be seen that the heating system as herein disclosed, can be roughly adjusted to secure approximately the correct heat output from the radiating system by properly manipulating the weights 46 and 47 on the reducing valve D. This establishes a certain sub-atmospheric steam pressure delivered to the radiators G, but thereafter this steam pressure will be adjusted automatically in accordance with changes in outdoor temperature, by means of the thermostat L and the cooperating control mechanism M and N. At the same time, whenever a desired maximum temperature is attained in any portion of the building in which one of the inside thermostats J or K is positioned, the valve D will be automatically closed to cut off the further supply of steam to the radiating system. The system will be again returned to the control of the pressure operated devices as soon as the temperature in the building has fallen below this desired maximum.

It will be noted in Fig. 1 that an auxiliary reducing valve D' has been positioned in a pipe loop 143 shunted around the main reducing valve D. By closing the cut-off valve 144 and opening the cut-off valve 145, the path of steam supply can be shunted through the pipe line 143 and controlled by the auxiliary reducing valve D'. This auxiliary reducing valve may be of the type disclosed in the Dunham patent hereinabove referred to, and controlled entirely from the adjustable weights, having no thermostatic control features. This auxiliary valve D' may be used as an emergency valve in case repairs or adjustment of the automatic control mechanism is required. This auxiliary valve D' should be positioned on a level with the valve D so that the by-pass pipe will not be water-sealed. It has been diagrammatically shown in the drawings at a lower level simply to facilitate the disclosure.

We claim:

1. In combination with a heating system comprising a source of steam and a radiating system, a reducing valve for controlling the flow of steam to the radiating system, said valve comprising operating means including a diaphragm for varying the setting of the valve, said diaphragm being subject at one side to the steam pressure existing at the low pressure side of the valve, thermostatically controlled means for varying the fluid pressure applied to the other side of the diaphragm in accordance with the temperature prevailing outside of the building to be heated, and thermostatic means for closing the valve when a predetermined maximum temperature is attained inside the building.

2. In combination with a heating system comprising a source of steam and a radiating system, a reducing valve for controlling the flow of steam to the radiating system, said valve comprising operating means including a diaphragm for varying the setting of the valve, said diaphragm being subject at one side to the steam pressure existing at the low pressure side of the valve, means for delivering a fluid under pressure to the other side of the diaphragm, a thermostat positioned outside of the building to be heated for varying through a range of pressures the effective pressure of this fluid, and a thermostat operative to close the valve when a predetermined maximum temperature is reached inside of the building.

3. In combination with a heating system comprising a source of steam and a radiating system, a reducing valve for controlling the flow of steam to the radiating system, said valve comprising operating means including a diaphragm for varying the setting of the valve, said diaphragm being subject at one side to the steam pressure existing at the low pressure side of the valve, a source of fluid at constant pressure independent of the steam supply, a reducing means for delivering this pressure fluid at any one of a plurality of selected pressures to the other side of the diaphragm, a thermostat, and means for electrically controlling the reducing means to select the effective pressure of the pressure fluid in accordance with the temperatures to which the thermostat is subjected.

4. In combination with a heating system comprising a source of steam, a radiating system, and a reducing valve for controlling the flow of steam to the radiating system, said valve comprising high and low pressure chambers, a movable valve member controlling the flow of steam from the high to the low pressure chamber, a valve stem projecting from this valve member, manually adjustable means for exerting a constant but adjustable pressure on the valve stem in one direction, a diaphragm connected with the valve stem, means for subjecting one side of the diaphragm to the pressure existing in the low pressure chamber, thermostatically controlled means for varying through a range of pressures the effective fluid pressure exerted on the other side of the diaphragm, and separate thermostatically controlled means for positively moving the valve stem in one direction independently of the pressure-operated diaphragm.

5. In combination with a heating system comprising a source of steam, a radiating system, and a reducing valve for controlling the flow of steam to the radiating system, said valve comprising high and low pressure chambers, a movable valve member controlling communication between the chambers, a valve stem projecting from the valve member, means for exerting a constant but adjustable pressure on the stem in one direction, a diaphragm connected with the stem, means for subjecting one side of the diaphragm to the pressure existing in the low pressure chamber, a chamber at the other side of the diaphragm, a conduit for a pressure-fluid leading to this latter chamber, said conduit having a plurality of branches through each of which the pressure-fluid may be permitted to flow at a different pressure, and a thermostatically controlled valve in each branch for selectively determining the pressure of the fluid delivered to the diaphragm chamber.

6. In combination with a heating system comprising a source of steam, a radiating system, and a reducing valve for controlling the flow of steam to the radiating system, said valve comprising high and low pressure chambers, a movable valve member controlling communication between the chambers, a valve stem projecting from the valve member, means for exerting a constant but adjustable pressure on the stem in one direction, a diaphragm connected with the stem, means for subjecting one side of the diaphragm to the pressure existing in the low pressure chamber, a chamber at the other side of the diaphragm, a conduit leading to this diaphragm chamber from a source of pressure-fluid under substantially constant pressure, said conduit having a plurality of branches in parallel between the source and the diaphragm chamber, a reducing valve in each branch these valves being set to deliver the pressure-fluid at a different selected pressure through each branch, and a thermostatically operated valve in each branch for determining through which branch and consequently at which pressure the fluid will be delivered to the diaphragm chamber in accordance with temperature changes.

7. In combination with a heating system comprising a source of steam, a radiating system, and a reducing valve for controlling the flow of steam to the radiating system, said valve comprising high and low pressure chambers, a movable valve member controlling communication between the chambers, a valve stem projecting from the valve member, means for exerting a constant but adjustable pressure on the stem in one direction, a diaphragm connected with the stem, means for subjecting one side of the diaphragm to the pressure existing in the low pressure chamber, a chamber at the other side of the diaphragm, a conduit leading to the diaphragm chamber from a source of pressure-fluid under substantially constant pressure, said conduit having a plurality of branches in parallel between the source and the diaphragm chamber, a reducing valve in each branch these valves being set to deliver the pressure-fluid at a different selected pressure through each branch, an electrically operated cut-off valve in each branch, a switch mechanism for selectively opening the cut-off valves, and a thermostat positioned to be subject to temperature changes outside the building being heated and adapted to operate the switch mechanism.

CHRISTIAN A. THINN.
ELBERT A. TAYLOR.